United States Patent
Goldman et al.

(10) Patent No.: US 7,536,170 B2
(45) Date of Patent: May 19, 2009

(54) STATIONARY FORCED PREMATURE DETONATION OF IMPROVISED EXPLOSIVE DEVICES VIA WIRELESS PHONE SIGNALING

(75) Inventors: Stuart Owen Goldman, Scottsdale, AZ (US); Richard E Krock, Naperville, IL (US); Karl F Rauscher, Emmaus, PA (US); James Philip Runyon, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 479 days.

(21) Appl. No.: 11/232,655

(22) Filed: Sep. 22, 2005

(65) Prior Publication Data

US 2007/0232304 A1    Oct. 4, 2007

(51) Int. Cl.
*H04M 11/04* (2006.01)
(52) U.S. Cl. ............. 455/404.1; 455/404.2; 455/456.1; 455/420; 340/539.26; 89/1.13
(58) Field of Classification Search ... 455/404.1–404.2, 455/567, 420; 340/539.26; 701/65; 379/45; 89/1.13; 102/403
See application file for complete search history.

(56) References Cited

U.S. PATENT DOCUMENTS

| | | | | |
|---|---|---|---|---|
| 3,701,024 A * | 10/1972 | Knowles et al. | ............. | 455/526 |
| 4,155,042 A * | 5/1979 | Permut et al. | ................ | 340/7.5 |
| 5,121,430 A * | 6/1992 | Ganzer et al. | ............... | 380/258 |
| 5,159,315 A * | 10/1992 | Schultz et al. | ......... | 340/539.26 |
| 5,278,539 A * | 1/1994 | Lauterbach et al. | .... | 340/539.18 |
| 5,442,805 A * | 8/1995 | Sagers et al. | ............. | 455/456.5 |
| 5,628,050 A * | 5/1997 | McGraw et al. | ............ | 455/12.1 |
| 5,781,852 A * | 7/1998 | Gropper | ..................... | 455/227 |
| 5,844,159 A * | 12/1998 | Posseme et al. | ............... | 89/1.13 |
| 5,995,553 A * | 11/1999 | Crandall et al. | ............. | 375/272 |
| 6,011,973 A * | 1/2000 | Valentine et al. | ......... | 455/456.6 |
| 6,112,074 A * | 8/2000 | Pinder | ..................... | 455/404.2 |
| 6,112,075 A * | 8/2000 | Weiser | ..................... | 455/404.1 |
| 6,278,375 B1 * | 8/2001 | Hucker | ......................... | 340/601 |
| 6,343,213 B1 * | 1/2002 | Steer et al. | .................. | 455/411 |
| 6,496,703 B1 * | 12/2002 | da Silva | ..................... | 455/456.4 |
| 6,556,810 B2 * | 4/2003 | Suzuki | ........................ | 455/88 |
| 6,745,021 B1 * | 6/2004 | Stevens | .................... | 455/404.1 |
| 6,765,492 B2 * | 7/2004 | Harris | ...................... | 340/686.6 |
| 6,799,031 B1 * | 9/2004 | Lewiner et al. | .......... | 455/404.1 |
| 6,807,564 B1 * | 10/2004 | Zellner et al. | ............... | 709/206 |
| 6,934,548 B1 * | 8/2005 | Gould et al. | ............. | 455/456.1 |
| 6,978,146 B1 * | 12/2005 | Yardman | ................. | 455/456.4 |
| 7,076,211 B2 * | 7/2006 | Donner et al. | ............. | 455/41.2 |
| 7,130,384 B2 * | 10/2006 | Goldman et al. | ............. | 379/37 |
| 7,130,624 B1 * | 10/2006 | Jackson et al. | ............. | 455/420 |
| 7,181,252 B2 * | 2/2007 | Komsi | ......................... | 455/567 |
| 7,218,708 B2 * | 5/2007 | Berezowski et al. | .......... | 379/37 |

(Continued)

*Primary Examiner*—Sharad Rampuria

(57) ABSTRACT

A precautionary measure against wireless phone-triggered Improvised Explosive Devices (IEDS) is described that forces premature detonation of the IED at a safe location, such as an unmanned checkpoint, thereby reducing the effectiveness of the IED. Embodiments of the invention provide for transmitting directionalized, low power alerting signals (e.g., paging, ringing, message waiting, text messages) from a stationary wireless terminal advantageously positioned a safe distance from a prospective target area, to mobile stations within a portion of a wireless service area defining an "IED detonation zone." In such manner, mobile stations within the IED detonation zone that are IED triggering devices (as well as mobile stations that are not IED triggering devices) will receive the alerting signals, thereby forcing premature detonation of IEDs in the detonation zone.

8 Claims, 3 Drawing Sheets

U.S. PATENT DOCUMENTS

| | | | |
|---|---|---|---|
| 7,277,015 B1 * | 10/2007 | Morhard et al. | 340/572.1 |
| 7,317,390 B2 * | 1/2008 | Huey et al. | 340/552 |
| 7,346,334 B2 * | 3/2008 | Gaeta et al. | 455/404.1 |
| 2007/0060045 A1 * | 3/2007 | Prautzsch | 455/3.06 |
| 2007/0234892 A1 * | 10/2007 | Goldman et al. | 089/1.13 |

* cited by examiner

STATIONARY FORCED PREMATURE DETONATION OF IMPROVISED EXPLOSIVE DEVICES VIA WIRELESS PHONE SIGNALING

CROSS-REFERENCE TO RELATED APPLICATIONS

This invention is related to U.S. patent application Ser. No. 11/233,198, titled "Mobile Forced Premature Detonation of Improvised Explosive Devices via Wireless Phone Signaling," filed concurrently with the present application and assigned to the assignee of the present invention.

FIELD OF THE INVENTION

This invention relates generally to the field of telecommunication systems and, more particularly, to a system and methods for triggering premature detonation of Improvised Explosive Devices (IEDs) utilizing wireless phone signaling.

BACKGROUND OF THE INVENTION

An Improvised Explosive Device (IED) is an explosive device that is cobbled together (or "improvised") for example, from commercial or military explosives, homemade explosives, military ordnance and/or ordnance components, typically by terrorists, guerrillas or commando forces for use in unconventional warfare. IEDs may be implemented for the purpose of causing death or injury to civilian or military personnel, to destroy or incapacitate structural targets or simply to harass or distract an opponent. IEDs may comprise conventional high-explosive charges alone or in combination with toxic chemicals, biological agents or nuclear material. IEDs may be physically placed at or near a pre-determined target or carried by person or vehicle toward a predetermined target or target of opportunity.

As will be appreciated, the design of construction of an IED and the manner and tactics for which a terrorist may employ an IED may vary depending on the available materials and sophistication of the designer. One known type of IED uses a wireless phone as a triggering device, such that a terrorist may remotely trigger detonation of the IED by calling the wireless phone. Generally, any alerting message associated with the phone (e.g., paging, ringing, message waiting, text message) can be the trigger that detonates the IED. It is a concern that this tactic will continue to be used to trigger bombings against civilian and military targets throughout the world. Accordingly, there is a need for precautionary measures to respond to this threat.

SUMMARY OF THE INVENTION

The present invention provides systems and methods for guarding against wireless phone-triggered IEDs by forcing premature detonation of the IED at a safe distance from a prospective target, thereby reducing the effectiveness of the IED. Embodiments of the invention provide for transmitting directionalized, low power alerting signals (e.g., paging, ringing, message waiting, text messages) from a stationary wireless terminal advantageously positioned a safe distance from a prospective target area, to mobile stations within a portion of a wireless service area defining an "IED detonation zone." In such manner, mobile stations within the IED detonation zone that are IED triggering devices (as well as mobile stations that are not IED triggering devices) will receive the alerting signals, thereby forcing premature detonation of IEDs in the detonation zone.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
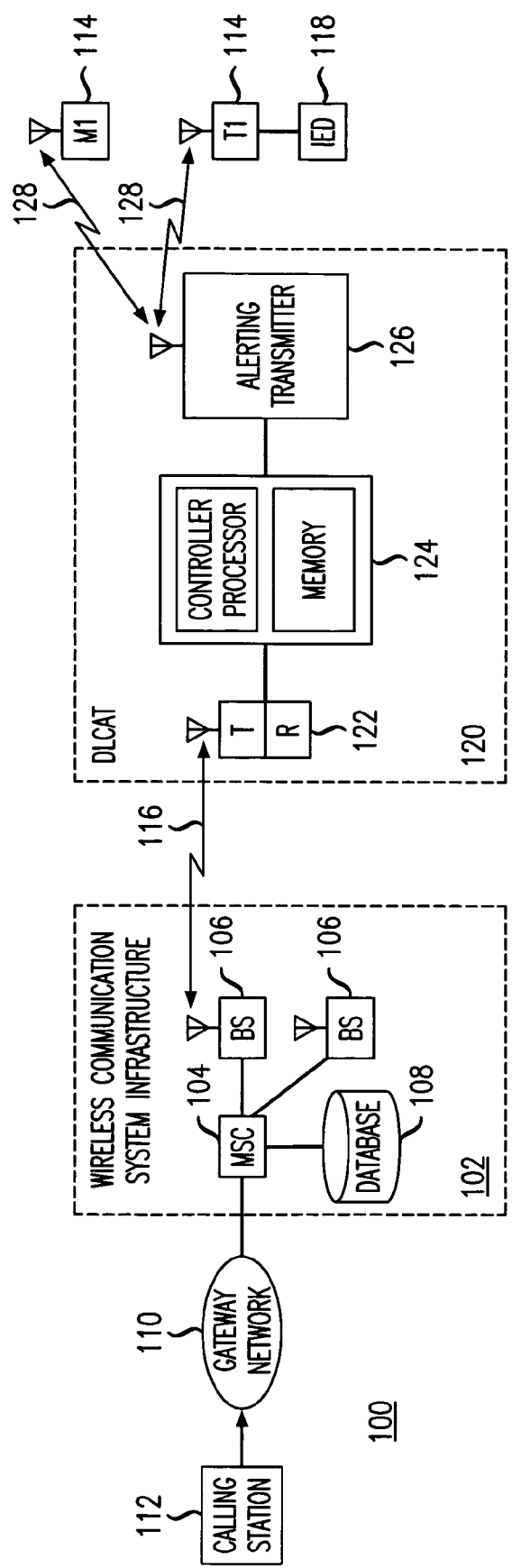
FIG. 1 is a block diagram of a wireless communication system including a stationary wireless terminal for forcing premature detonation of IEDs according to embodiments of the invention.

FIG. 1 depicts the basic architecture of a wireless communication system 100 in which the present invention may be implemented. At the heart of the wireless communication system 100 is a wireless communication system infrastructure 102 comprising a switching element 104 (as shown, a mobile switching center (MSC)), a plurality of base stations 106 (two shown) and a database 108.

The MSC 104 may comprise, for example, an AUTOPLEX™ switching system, available from Lucent Technologies, Inc. The MSC 104 includes a memory and processor (not shown), for storing and executing software routines for processing and switching calls and for providing various call features to calling or called parties. The MSC 104 may be configured for operation with generally any suitable circuit, cell, or packet switching technology. As will be appreciated, the MSC 104 is a functional element that may reside in a single device or may be distributed among multiple devices and/or locations.

As shown, the MSC 104 is connected via a gateway network 110 to a calling station 112. The gateway network 110 may comprise, for example, the Public Switched Telephone Network (PSTN) or a wireless network. Alternatively or additionally, the gateway network 110 may comprise or may be interconnected with a number of different types of networks including local area networks (LANs), wide area networks (WANs), metropolitan area networks (MANs), the Internet, virtual private networks (VPNs) and/or corporate intranets. As will be appreciated, the MSC 104 may receive incoming calls from any of several types of calling stations 112 connected to the network 110. The network 110 may be implemented using any appropriate transmission, switching and routing technologies, including but not limited to Internet Protocol (IP) and Asynchronous Transfer Mode (ATM) technologies.

For purposes of example, it is presumed the MSC 104 receives an incoming call via the gateway network 110 that is directed to a mobile station 114 served by the MSC 104. The database 108 (sometimes referred to as a location register) includes identification information (e.g., identification number, directory number) and location information of various mobile stations 114 having registered with the MSC 104. The process of mobile stations registering with an MSC is well known and will not be described in detail herein. Suffice it to say that mobile stations 114 exchange identification information with the various base stations 106 as they roam about throughout respective coverage areas (a.k.a., "cells"); and the base stations report the identity and location of the mobile stations to the MSC 104. This identity and location information is stored in the database 108 and retrieved by the MSC 104 as necessary, for example, when routing a call to a called mobile station 114. The database 108 is a functional element that may reside in one or more physical locations, either integral with or remote from the MSC 104. The MSC assigns a wireless link 116 between the mobile station and the relevant base station to support the call. The wireless link 116 may implement air interface technologies including, for example and without limitation, CDMA, TDMA, GSM, UMTS or IEEE 802.11.

As will be appreciated, the called mobile stations 114 may comprise mobile phones or generally any type of subscriber device capable of communicating via the wireless link 116 to receive incoming calls, messages or the like. It is contemplated that most of the mobile stations 114 will be "legitimate" (i.e., unaltered) devices operated, for example, by the general public or government authorized users. As shown, mobile station M1 depicts a legitimate terminal. However, most particularly when the communication system 100 resides in a heightened security risk area, it is contemplated that some of the mobile stations 114 may comprise triggering devices operated, for example, by terrorists to detonate an IED upon receiving an alerting message (e.g., paging, ringing, message waiting or text message). As shown, mobile station T1 depicts such a triggering device attached to an IED 118.

The communication system 100 further includes a Directionalized Local Cellular Alerting Transmitter (DLCAT) 120. In one embodiment, as will be described in greater detail in relation to FIG. 2 and FIG. 3, the DLCAT 120 comprises a stationary wireless terminal, advantageously positioned a safe distance from a prospective target area (e.g., at a remote checkpoint or pre-stage area) that is adapted to force premature detonation of any IED triggering devices T1 within a particular area. The DLCAT 120 includes a transceiver 122 for communicating with the MSC 104 via the base stations 106 and wireless resources 116. In one embodiment, the DLCAT registers with the MSC 104 and periodically receives, from the MSC, the identity of the various mobile stations 114 within a particular service area (e.g., within the base station coverage area encompassing the DLCAT). The DLCAT 120 further includes a controller 124 having a memory and processor, for storing the identity of the mobile stations 114 and executing software routines for alerting certain mobile stations within the wireless service area. The DLCAT includes an alerting transmitter 126 for sending alerting signals (e.g., paging, ringing, message waiting, text messages) to the mobile stations 114 via wireless resources 128. In one embodiment, the alerting transmitter 126 transmits alerting signals in a particular direction and at low power, so that only mobile stations within a portion of the service area (defining a "IED detonation zone") will receive the alerting signals. Any IED triggering devices T1 within the IED detonation zone will receive the alerting signals and trigger detonation of their associated IED 118—but at the remote location a safe distance from a prospective target. Any legitimate devices M1 within the IED detonation zone will also receive the alerting signals but the alerting signals will cause relatively harmless "phantom" rings or the like. Any devices outside the IED detonation zone will not receive the alerting signals.

Figure 2:
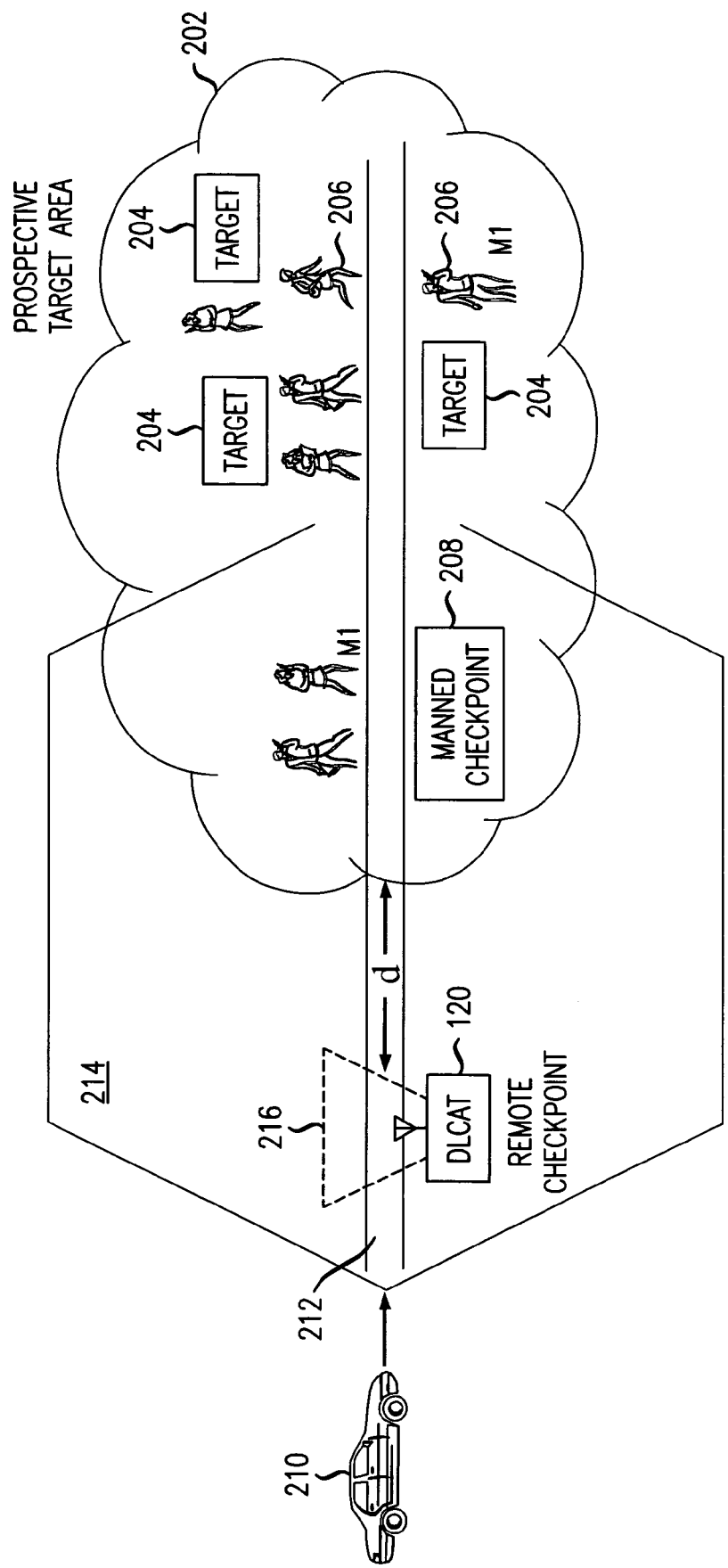
FIG. 2 illustrates a manner of employing the stationary wireless terminal at a remote checkpoint to protect a prospective target area.

FIG. 2 illustrates a manner of employing the DLCAT 120 at a remote checkpoint to protect a prospective target area 202. Generally, the prospective target area 202 includes various structural targets 204 and persons 206 that are at some risk of attack, for example, from IEDs deployed by a terrorist group or other opponent. As has been noted, one known tactic is to utilize mobile stations T1 (not shown in FIG. 2) as triggering devices for detonating IEDs. The mobile stations T1 and associated IEDs may be carried, for example, by suicide bombers, or may even be carried unwittingly by a person or vehicle into the prospective target area 202. In some cases, as shown, the prospective target area may also include a manned checkpoint 208 for inspecting vehicles or persons for IEDs as they attempt to travel to the prospective target area 202. The manned checkpoint 208 comprises part of the prospective target area because it includes persons 206 that are at risk of attack from IEDs.

As shown, vehicle 210 is traveling on a transportation path 212 toward the prospective target area. Vehicle 210 is presumed to be a threat to the prospective target area, at least initially, since it might possibly be carrying a mobile triggering device T1 and associated IED toward the prospective target area. In one embodiment, the DLCAT 120 is deployed at a remote, advantageously unmanned, checkpoint situated along the transportation path. The DLCAT 120 resides within a base station coverage area 214 and sends directionalized, low-power alerting signals within a portion of the coverage area 214 defining an IED detonation zone 216. The IED detonation zone 216 encompasses at least a portion of the transportation path 212 such that when the vehicle 210 crosses the remote checkpoint it receives the alerting signals. In such manner, if the vehicle includes a triggering device T1 and associated IED, the alerting signals will force premature detonation of the IED at the remote checkpoint. Advantageously, the remote checkpoint will be a safe distance d from the prospective target area (e.g., 500 ft.) such that detonation of the IED will not cause significant injury to persons or damage to structural targets within the prospective target area. Of course, the distance d is variable depending on the anticipated destructive characteristics of the IED and/or the ability of the target area to withstand damage from an IED.

Figure 3:
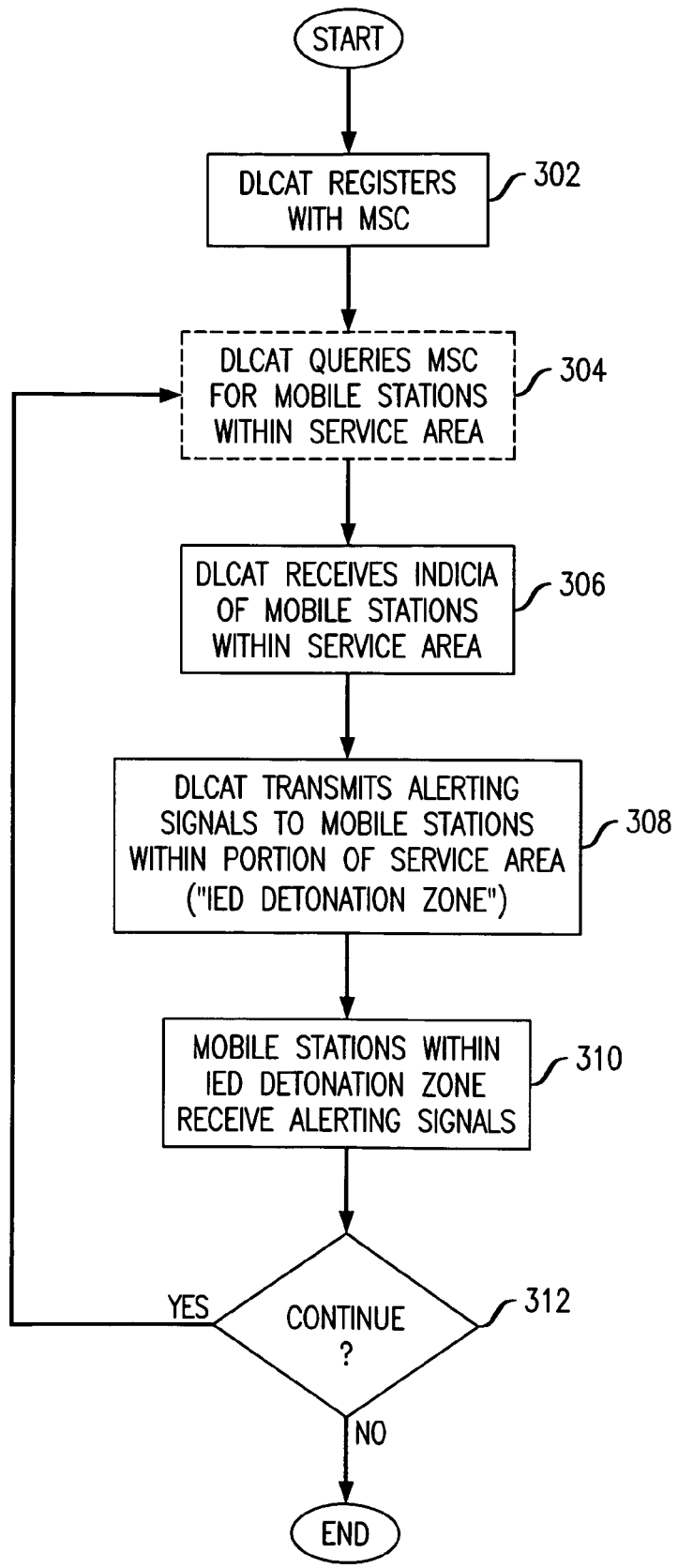
FIG. 3 is a flowchart of a method exercised by the stationary wireless terminal in embodiments of the present invention to force premature detonation of IEDs.

FIG. 3 is a flowchart of a method exercised by the DLCAT 120 to force premature detonation of IEDs, for example, before they reach a prospective target area 202. The steps of FIG. 3 are implemented, where applicable, by software routines executed within the DLCAT 120. Generally, however, the steps of FIG. 3 may be implemented on any computer-readable signal-bearing media residing within or remote from the DLCAT. The computer-readable signal-bearing media may comprise, for example and without limitation, floppy disks, magnetic tapes, CD-ROMs, DVD-ROMs, hard disk drives or electronic memory. The computer-readable signal-bearing media store software, firmware and/or assembly language for performing one or more functions relating to the steps of FIG. 3.

At step 302, the DLCAT 120 registers with its controlling MSC 104 (i.e., the MSC supporting its present location). In one embodiment, the DLCAT registers with the MSC 104 in similar manner as mobile stations register within the service area of the MSC, by communicating identification information from its transceiver 122 with a serving base station. In one embodiment, the DLCAT is deployed on a stationary platform somewhere within the paging/coverage area of a serving base station controlled by the MSC 104. Accordingly, the DLCAT registers with the MSC by sending identification information to its serving base station; and in turn, the serving base station communicates the identification, as well as location information identifying the paging/coverage area of the DLCAT, to the controlling MSC. The MSC stores this identity and location information in the database 108.

In one embodiment, responsive to the DLCAT registering with the MSC 104, the MSC retrieves the identity of mobile stations within a particular service area (e.g., that are within the same base station coverage/paging area of the DLCAT) and sends this information, via the serving base station, to the DLCAT. Optionally, at step 304, the DLCAT queries the MSC 104 for the indicia of mobile stations located within a particular service area. At step 306, the DLCAT receives the indicia of mobile stations within the service area. In one embodiment, this information comprises directory numbers and/or mobile identification numbers associated with the mobile stations that are within the same base station coverage/paging area of the DLCAT. For example, with reference to FIG. 2, the DLCAT 120 receives indicia of mobile stations that are within base station coverage area 214.

Generally, as has been noted, the identified mobile stations will comprise a plurality of legitimate devices (e.g., M1) operated, for example, by the general public or government authorized users, and possibly one or more IED triggering devices (e.g., T1). At step 308, the DLCAT uses its alerting transmitter 126 to send one or more alerting signals to the mobile stations (e.g., M1, T1) within the service area. The alerting signals are unsolicited signals comprising, for example and without limitation, paging signals, ringing signals, message waiting signals or text messages directed to the mobile stations M1, T1. The alerting signals may comprise directory number specific messages, broadcast messages or a combination thereof. In one embodiment, the alerting transmitter 126 is arranged and constructed to send directionalized, low-power alerting signals within a portion of the coverage area 214 defining an IED detonation zone 216 (FIG. 2). As will be appreciated, the power and/or direction of the alerting signals, and hence the size of the IED detonation zone 216, may be varied to cover a greater or smaller portion of the coverage area 214 as needed or desired. Indeed, the IED detonation zone 216 can extend beyond the coverage area 214.

At step 310, the mobile stations M1, T1 within the IED detonation zone 216 receive the alerting signals. Alerting signals received by any triggering devices T1 within the IED detonation zone will cause detonation of their associated IEDs; whereas alerting signals received by legitimate devices M1 will cause phantom rings or the like. The process may continue, determined at step 312, if desired to receive periodic updates of mobile stations M1, T1 within the service area and send alerting signals to the updated group of mobile stations M1, T1. Updates may be received responsive to the DLCAT querying the MSC, by receiving periodic unsolicited updates from the MSC or a combination thereof. Optionally, the process may be discontinued, for example, if and when the threat of IEDs to the prospective target area is deemed sufficiently diminished.

It is noted, while embodiments of the present invention provide for propagating alerting signals originated by the DLCAT 120 throughout an IED detonation zone 216, the invention does not contemplate interference with customary mobile station operations within the detonation zone 216. Legitimate devices M1, and even triggering devices T1 within the detonation zone 216 may communicate as usual with the base station serving the detonation zone to perform call originations or terminations. Accordingly, mobile stations M1, T1 may receive alerting signals from a serving base station or from the DLCAT 120 while in the detonation zone 216. Mobile stations M1, T1 outside of the detonation zone will not receive alerting signals from the DLCAT (at least until such time as they roam within the detonation zone) but still may receive alerting signals from a serving base station coincident to normal operation. Accordingly, embodiments of the invention do not prevent an IED from detonating, however they do cause it to prematurely detonate, advantageously at an unmanned checkpoint by operation of alerting signals from the DLCAT.

The present invention may be embodied in other specific forms without departing from its spirit or essential characteristics. The described embodiments are to be considered in all respects only as illustrative and not restrictive. For example, although bombs have typically been detonated through a ringing mobile telephone, any other type of device such as a PDA, or other analog or digital mobile terminal or wireline terminal could be used to trigger any type of explosive device or weapon that could cause panic and/or harm to lives and property. Further, although described in connection with IEDs, embodiments of the present invention could be applied to other emergency situations that might occur in which a ringing mobile terminal or other device could trigger devices other than IEDs. The scope of the invention is, therefore, indicated by the appended claims rather than by the foregoing description. All changes that come within the meaning and range of equivalency of the claims are to be embraced within their scope.

What is claimed is:

1. A method comprising:
    identifying one or more mobile stations registered within a service area of a wireless communication system, the mobile stations potentially comprising Improvised Explosive Device (IED) triggering devices; and
    transmitting, from a stationary platform, one or more directionalized, low power alerting signals to the mobile stations within a portion of the service area defining an IED detonation zone, thereby alerting the mobile stations including any IED triggering devices within the IED detonation zone, the IED detonation zone defining the portion of the service area in which the mobile stations can receive the alerting signals;
    performed by a wireless terminal defining a directionalized local cellular alerting transmitter (DLCAT) residing at the stationary platform, where the DLCAT is not part of a telecommunication infrastructure system with which the mobile stations have subscribed for wireless communication services, the alerting signals transmitted by the DLCAT are directory number specific signals associated with respective mobile stations within the IED detonation zone.
    wherein the directionalized, low power alerting signals have a power low enough such that only mobile stations within the IED detonation zone will receive the alerting signals so that any mobile stations outside the IED detonation zone will not receive the alerting signals.

2. The method of claim 1, wherein the step of transmitting comprises transmitting alert signals comprising one or more of: paging signals, ringing signals, message waiting signals and text messages, to the mobile stations in the IED detonation zone.

3. The method of claim 1, wherein the step of identifying comprises the DLCAT receiving, from a Mobile Switching Center (MSC) of the wireless communication system, the identity of mobile stations registered within a base station coverage area served by the MSC.

4. The method of claim 3, wherein the step of receiving is accomplished coincident to the DLCAT registering with the MSC from within the base station coverage area.

5. The method of claim 3, wherein the step of receiving is accomplished coincident to the DLCAT querying the MSC from within the base station coverage area.

6. A wireless terminal comprising:

a telecommunications receiver for receiving, from a wireless communication system, indicia of one or more mobile stations registered within a service area of a wireless communication system, the mobile stations potentially comprising Improvised Explosive Device (IED) triggering devices; and an alerting transmitter for transmitting one or more directionalized, low power alerting signals to the mobile stations within a portion of the service area defining an IED detonation zone, thereby alerting the mobile stations including any IED triggering devices within the IED detonation zone, the IED detonation zone defining the portion of the service area in which the mobile stations can receive the alerting signals;

the telecommunications receiver and alerting transmitter both being located adjacent the IED detonation zone, and the directionalized, low power alerting signals having a power low enough such that only mobile stations within the IED detonation zone will receive the alerting signals so that any mobile stations outside the IED detonation zone will not receive the alerting signals;

wherein the alerting transmitter defines a directionalized, local cellular alerting transmitter (DLCAT) operable to transmit directionalized, low power alerting signals to the mobile stations within the service area, the IED detonation zone defining the portion of the service area in which the mobile stations can receive the alerting signals, where the DLCAT is not part of a telecommunication infrastructure system with which the mobile stations have subscribed for wireless communication services, the alerting signals transmitted by the DLCAT are directory number specific signals associated with respective mobile stations within the IED detonation zone.

7. The wireless terminal of claim 6 wherein the DLCAT is operable to transmit alerting signals comprising one or more of: paging signals, ringing signals, message waiting signals and text messages, to the mobile stations in the IED detonation zone.

8. The wireless terminal of claim 6, wherein the DLCAT resides at a stationary platform located a predetermined safe distance from a prospective target area.

* * * * *